N. W. DALTON.
AUTOMATIC SAFETY DEVICE FOR AERONAUTICAL MOTORS.
APPLICATION FILED MAR. 25, 1918.
1,437,466.
Patented Dec. 5, 1922.
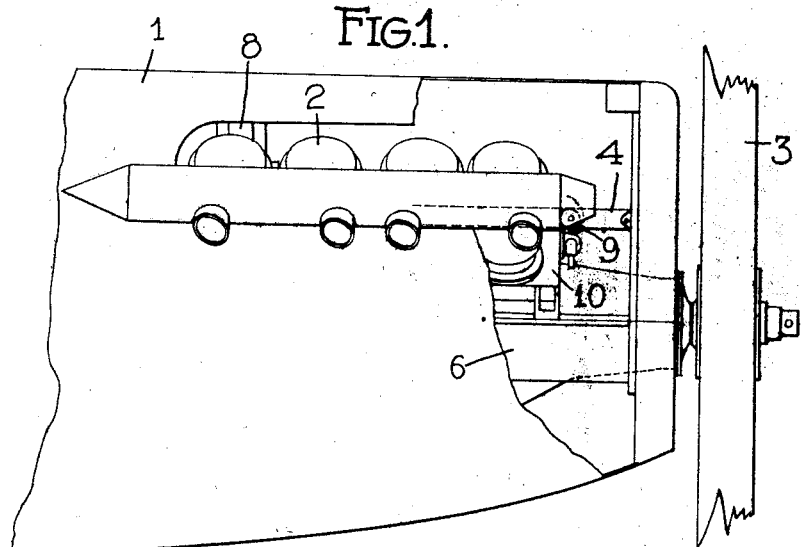
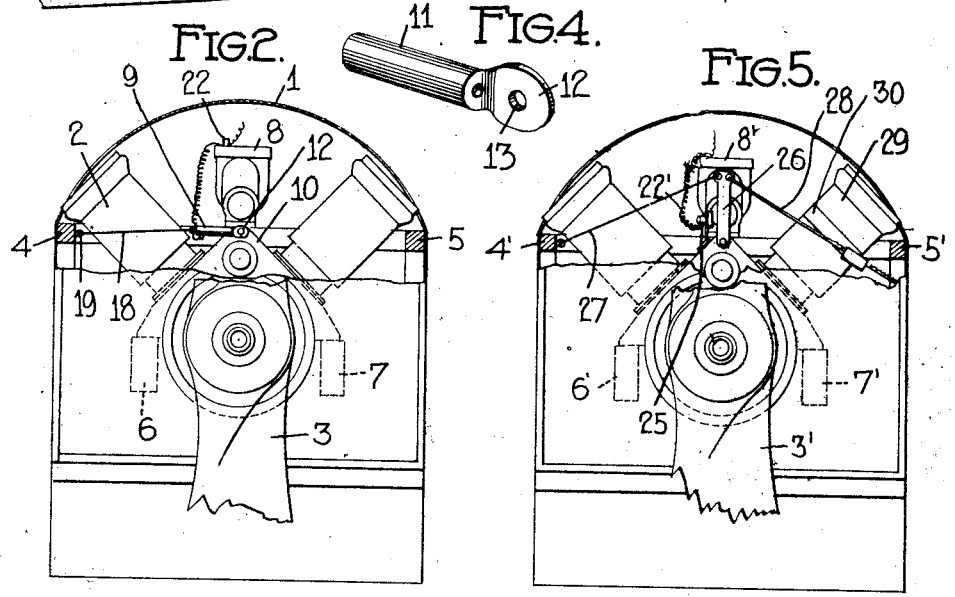
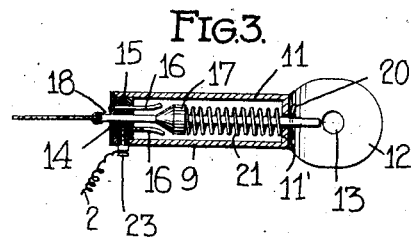
INVENTOR
NELSON W. DALTON.
ATTORNEY Patented Dec. 5, 1922.

1,437,466

UNITED STATES PATENT OFFICE.

NELSON W. DALTON, OF GARDEN CITY, NEW YORK, ASSIGNOR TO CURTISS AEROPLANE AND MOTOR CORPORATION, A CORPORATION OF NEW YORK.

AUTOMATIC SAFETY DEVICE FOR AERONAUTICAL MOTORS.

Application filed March 25, 1918. Serial No. 224,546.

*To all whom it may concern:*

Be it known that NELSON W. DALTON, a citizen of the United States, residing at Garden City, in the county of Nassau and State of New York, has invented certain new and useful Improvements in Automatic Safety Devices for Aeronautical Motors, of which the following is a specification.

This invention relates to aeronautics and especially to safety devices for use in connection with the driving mechanism of aeroplanes, airships and other aircraft.

Considerable trouble has heretofore been experienced in the racking of the framework upon which the power plant is mounted when for any reason the propeller fails or is broken during operation, and such racking operation often results in dangerous stresses being set up both in the motor and in the main body of the aircraft. This is caused mainly by the unbalanced forces which are set up when such contingency occurs, and is aggravated by the high speed of the motor, it being the usual practice to employ high speed motors in aeronautical application. The racking may be so severe and often occurs so suddenly that the pilot is unable to stop the motor before serious damage and probable unbalancing of the aircraft as a whole takes place. This may not only result in a partial or complete loss of the aircraft, but also in injury or death to the aviator. The object of my invention is to avoid these contingencies which occur upon the weakening or failure of any part of the propeller, or for that matter, any part of the prime mover. I accomplish this purpose by the provision of an automatic arrangement for slowing down the speed of or entirely stopping the prime mover. In the application to an internal combustion engine, which is the prime mover most universally used at the present day, this automatic arrangement may embody means for either shutting off the supply of fuel thereto or means for discontinuing the operation of the ignition. Preferably, and in the present embodiment I have illustrated the automatic means as comprising devices associated with the ignition system whereby upon undue vibration of the motor with reference to its mounting or with reference to the aircraft body, or upon a pronounced racking movement of the aeroplane body, the ignition circuit is interrupted or short circuited, automatic stoppage of the motor being thereby accomplished immediately upon any of the aforesaid contingencies taking place. It is obvious that instead of entirely stopping the motor, the speed thereof may be reduced to a harmless value, without departing from the spirit of my invention.

For a better understanding of my invention reference may be had to the accompanying drawings which illustrate one embodiment of the many forms my invention is capable of assuming, wherein;

Fig. 1 is a side view of the forward end of the fuselage of an aeroplane of the tractor type, Fig. 2 is an end view thereof with certain parts broken away and in section, for convenience in illustration, Fig. 3 is a detail of the switch mechanism, Fig. 4 is a perspective view of the switch casing, Fig. 5 is an end view corresponding to Fig. 2, illustrating a slightly modified arrangement of automatic control devices, and Fig. 6 is a detail of certain of the automatic devices illustrated in Fig. 5.

Referring to the drawings wherein like numerals designate similar parts throughout, the forward end of the fuselage is designated by the numeral 1, and therewithin is located a prime mover 2, specifically of the internal combustion engine type, and to the shaft of this motor is fixed a driving screw or propeller 3. Two of the longerons of the fuselage are indicated at 4 and 5 respectively and the motor 2 is mounted in the usual manner upon the longitudinally disposed supporting beams 6 and 7. The motor illustrated is of the V type and has mounted within the V one or more sources of current for ignition purposes, one of these sources being designated by the numeral 8 and specifically a small igniting dynamo electric machine, this being illustrated diagrammatically for convenience in illustration. It is understood of course that this magneto 8 has circuits leading to spark coils or directly to the cylinders of the engine, these circuits not being illustrated in detail in order to avoid complications in the drawings. When the propeller 3 fails, breaks or is shattered during the operation thereof considerable unbalancing of the parts takes place and the motor 2 immediately begins to vibrate upon its mountings 6 and 7 which results in considerable relative displacement of the motor and the body of the aeroplane, and may result in a complete wrecking of the motor framework and the aeroplane body. Before the racking operation, however, becomes so exaggerated as to entirely wreck the aircraft, the safety means which I have provided for automatically discontinuing or stopping the rotation of the motor, comes into operation and reduces the speed of the motor to a harmless value. The specific means provided in this embodiment for accomplishing this purpose comprises an automatic switch which is caused to operate upon the ignition circuit or circuits of the engine in such a manner as to discontinue the igniting current supplied to the spark plugs, and more specifically still, I provide an automatic switch which upon the breakage of the propeller is caused to short circuit the magneto, which operation, as is well understood, shuts off all supply of igniting current to the sparkers. For this purpose I have provided a switch mechanism 9 one operative member of which is attached to a convenient part of the motor, as for instance, to the end 10 of the crank case and the other operative member of which is attached to one of the longerons, as 4. This switch comprises a tubular member 11 having formed on one end thereof an ear 12 which is provided with a transverse opening 13 for securement to the end of the crank case 10. The opposite end of this tubular member is provided with an insulating plug 14 which cooperates with an insulating bushing 15 to carry a pair of contacts 16, these contacts 16 being securely gripped between the plug 14 and the sleeve 15 and thereby retained in position. The contacts 16 may be formed separately from one another or they may be integrally formed as for instance by stamping out of a tubular stock of metal. For co-operation with these contacts 16 there is provided a contact member 17 which is carried by the rod 18 having one end fixed to the longeron 4 by means of a cable or other suitable connection 19. The rod 18 extends longitudinally thru the tubular member 11, openings being provided in the plug 14 and the closed end 11' for this purpose. On its projecting end this rod 18 carries a breakable pin 20 which upon being subjected to shearing or other breaking strains gives way and permits this rod to slide thru the tubular member 11. A spring 21 engages the bottom of the tubular member 11 at one end and at the other end engages the contact 17 which continually urges the contact 17 with the rod 18 towards the left into closing relation with the contact 16. The main supply wire of the magneto 8 is indicated at 22 and a connection leads therefrom to a contact screw 23 which passes thru a transverse opening in the tubular member 11 and thru the insulated bushing 15 to engage with the contact member 16. By having this set screw enter an aperture formed in the contact 16 the same is securely locked in position against disassembly from shocks and other disturbing conditions. A circuit is thereby formed which leads from the magneto 8 thru the conductor 22, contact screw 23, contact 16, and the contact 17 and rod 18, to the motor frame. The operation of my invention is clear from the above description. When for any cause the motor begins to vibrate excessively on its frame or within the fuselage and relative displacement takes place between the longeron 4 and the motor frame, this relative displacement causes the locking pin 20 to give way and permit the rod 18 with its contact 17 to come into electrical engagement with the cooperating contact 16 under the influence of the spring 21 and this connection formed in this manner as above set forth grounds the magneto to the frame and shuts off all supply of current to the igniting means, resulting in a complete shut down of the motor. The spring 21, after the breaking of the locking pin 20 maintains the contacts 17 and 16 into engagement with each other. It is clear, therefore, that after the first excessive or lateral vibration of the motor, or relative displacement of the motor with respect to the frame or main body of the aeroplane, it is impossible for the motor to continue in operation. The motor having been stopped all danger of wrecking the motor frame and aeroplane body and the resultant unbalancing of the aircraft are avoided thereby. If the aircraft is in the air when the accident takes place the aviator with his motor shut down is able to make a safe landing and if the accident happens while the aircraft is on the ground the complete stoppage of the motor results from the operation of my invention, and the wrecking of the aeroplane body completely avoided.

In the embodiment illustrated in Fig. 5 the cooperating contact members of the automatic switch comprise a spring contact 25 suitably attached to the top of the motor crank case and having the magneto wire 22' connected therewith. A cooperating contact member 26 is illustrated as in the form of a vertically disposed rocking arm pivoted to the motor frame at its lower end. The upper end of this contact 26 is connected with the longeron 4' by means of a cable or other connections 27 and on the opposite side is connected by means of a rod 28 with a cylinder 29 of the motor. The connection between the rod 28 and the cylinder 29 is in the nature of a one way slip connection which permits relative movement of the two parts in one direction but forbids this in the other direction. The specific devices illustrated comprise a strap or collar 30 surrounding the cylinder jacket 29 and a sleeve 31 suitably attached thereto (preferably pivoted) thru which the serrated end 28′ of the rod passes, this serrated end cooperating with the similarly serrated inner portion of the sleeve formed on the sleeve 31, the serrations being formed in such a manner as to permit movement of the rod 28 to the left but to prevent the movement of the same to the right. A leaf spring 32 engages the back side of the serrated end 28′ and maintains the same into engaging relation with the serrations on the inner surface of the sleeve. The operation of this modification is quite similar to the operation of the modification shown in the other figures, wherein upon undue vibration of the motor from any cause, as for instance, the chipping, shattering or unbalancing of the propeller, the rod 28 is caused to slip thru the serrated sleeve 31 which causes the racking of the contact member 29 into engagement with the spring contact 25, thereby causing the shut down of the motor in the manner indicated above. It is understood that the spring 32 maintains the actuating rod 28 in its actuated position after it has once been slipped or drawn thru the sleeve 31 and accordingly the stoppage of the motor is sure until the cause of the disturbance is entirely removed.

In accordance with the patent statutes I have set forth my invention in the specific manner required thereby, but it is understood that the invention is capable of assuming other forms than those illustrated, and that the claims hereto annexed are not to be limited to the specific devices set forth, except as is specifically recited therein, but are to be given a construction commensurate with the scope of the invention, due regard being paid to a consideration of the prior art.

What is claimed is:

1. In an aircraft, the combination of a main body frame, an internal combustion engine mounted therewithin, a propeller driven by said internal combustion engine and means operative upon a predetermined displacement of said engine with reference to the main body frame for reducing the power supplied to the engine.

2. In an aircraft, the combination of a main body frame, an internal combustion engine associated therewith, electrical igniting means for said engine, a propeller driven by said internal combustion engine and means operative upon a predetermined relative displacement between said engine and said frame for discontinuing the operation of the said igniting means.

3. In an aircraft, the combination of a main body or fuselage, an internal combustion engine mounted therewithin, a source of electrical power for igniting the fuel supply to said engine and means operative upon a lateral displacement between said body and said engine for throwing out of operation the electrical igniting means.

4. In an aircraft, the combination of a fuselage, an internal combustion engine mounted therewithin, a propeller driven by said engine, an ignition circuit grounding switch carried by said internal combustion engine, said switch being normally locked in the open position, with means attached to a longeron of said body to automatically close said switch upon excessive relation displacement of said motor with reference to said longeron.

5. In an aircraft, the combination of a body, an internal combustion engine mounted therewithin, a propeller driven by said engine, an ignition circuit grounding switch having one of its members operatively associated with the motor and the other member operatively associated with the body, and means for causing said members to engage each other when a predetermined relative lateral displacement takes place between said body and said motor.

6. The combination of an aeroplane frame, an engine mounted thereon, an ignition system for the engine, a normally open cut-out switch for grounding the ignition system, and means dependent on the displacement of the engine in the frame for permitting the cut-out switch to close.

7. The combination of an aeroplane frame, a propelling engine therefor having an ignition system including a ground wire, a normally open cut-out switch for grounding the said wire, said switch including normally separated contacts, means for urging the contacts toward each other, and a device connected with the aeroplane frame and associated with the contacts, whereby the movement of the engine with respect to the frame causes the said device to permit the contacts to engage each other.

In testimony whereof I hereunto affix my signature.

NELSON W. DALTON.